(12) United States Patent
Parthesarathy et al.

(10) Patent No.: US 6,353,926 B1
(45) Date of Patent: *Mar. 5, 2002

(54) SOFTWARE UPDATE NOTIFICATION

(75) Inventors: Srivatsan Parthesarathy, Issaquah; Reiner Fink, Mercer Island; Sean L. Flynn, North Bend; Ray Sun, Redmond, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,645

(22) Filed: Jul. 15, 1998

(51) Int. Cl.[7] .............................................. G06F 9/445
(52) U.S. Cl. ......................................... 717/11; 707/203
(58) Field of Search .......................... 395/712; 345/335, 345/356, 650, 661, 676, 700, 748, 749, 752, 763; 455/419; 709/217, 219; 714/46; 717/11, 3; 707/203; 713/100

(56) References Cited

U.S. PATENT DOCUMENTS

| | | | |
|---|---|---|---|
| 5,586,304 A | | 12/1996 | Stupek, Jr. et al. ............ 717/11 |
| 5,694,546 A | * | 12/1997 | Reisman ....................... 705/26 |
| 5,732,275 A | * | 3/1998 | Kulick et al. .................. 717/11 |
| 5,821,937 A | * | 10/1998 | Tonelli et al. ............... 345/853 |
| 5,831,610 A | * | 11/1998 | Tonelli et al. ............... 345/735 |
| 5,896,566 A | * | 4/1999 | Averbuch et al. ............ 455/419 |
| 5,919,247 A | * | 7/1999 | Van Hoff et al. ............ 709/217 |
| 5,983,369 A | * | 7/1999 | Bakoglu et al. ............... 714/46 |
| 6,021,433 A | * | 2/2000 | Payne et al. ................. 709/219 |

* cited by examiner

Primary Examiner—Tuan Q. Dam
Assistant Examiner—Hoang-Vu Antony Nguyen-Ba
(74) Attorney, Agent, or Firm—Banner & Witcoff, Ltd.

(57) ABSTRACT

A method for allowing a software vendor to notify a user of a software update is disclosed. At the time of installing an application, the user is prompted to subscribe to a software update channel. A shortcut (.lnk file) that the application installs is created with special information that identifies the application by a unique name. The channel is updated periodically based on the schedule suggested by the channel. When a new update is detected, the software channel delivers the software update to the user's computer and sends notifications such as email or gleaming the icon to indicate that a new software update is now available. Also, the next time the user launches the application through the shortcut (.lnk file), the shell automatically displays the update notification information to the user.

26 Claims, 4 Drawing Sheets

SOFTWARE UPDATE NOTIFICATION

FIELD OF THE INVENTION

This invention relates generally to software distribution, and more particularly to a method of notifying a user of software updates using a software update notification channel.

BACKGROUND OF THE INVENTION

Historically, the primary medium for software distribution has been either the traditional floppy disk or the more recent compact disc (CD-ROM). However, more and more individuals are acquiring software by downloading it from remote server computers connected to the client computers through the Internet. Additionally, companies and organizations are distributing software to their users across their local area networks. The physical medium is a network cable and the supporting communication hardware are the fixed cost associated with the establishment of the network. Therefore, distributing and installing software over an existing network bypasses the costly overhead of producing CDs or floppy disks.

In addition, using the network as the distribution medium profoundly reduces the software's total cost of ownership to an extent that cannot be achieved by CDs or floppies even when the media cost almost nothing to manufacture. Software distribution via CDs and floppies obeys the "pull" paradigm, where every action is user-initiated. Distribution over the network has the ability to apply a "push" paradigm which provides three main benefits.

First, the installation is "hands-free" in that the user does not have to manually install the software. Second, the software can easily and timely be upgraded from a designated location because the burden of upgrading is borne by the software itself Third, because different types of computer hardware and operating systems can connect to a common network, software distributed over the network can be made to work across platforms or intelligent so that only the correct version of platform-specific software is pushed down to the user.

However, current methods of software distribution over a network do not fully exploit the benefits. Existing distribution of platform-specific, or "native code," software relies on installation file formats that are hard to create, not extensible, and specific to a particular operating system. Although most current software is written in modules, there is no current mechanism that handles the situation where one component in a software program requires the presence of another to operate. If a user downloads software from a Web page, the user may discover that the program requires an external library which necessitates another network session to download, assuming the user can find the right location, and then the user must manually install the library before installing the software.

Furthermore, software vendors today do not have a good infrastructure to notify users of their application about updates to their software, critical bug fixes, etc. If at the time of registering the software, the user can provide the vendor with an email address which the vendor can use to communicate information about upgrades to the user. However, few people actually register partially out of a concern that their anonymity will not be preserved and the fear of being "spammed" with junk email. Even if the software vendor has a web page that describes the updates, there is no compelling infrastructure that will make the user aware that the web page has changed or let the user know automatically at the time the application is used that an update is available.

SUMMARY OF THE INVENTION

The above-described shortcomings, disadvantages and problems are addressed by the invention by providing methods for allowing software vendors to automatically notify users of updates preferably when the application is being used by the user.

The invention described herein leverages channel architecture and Open Software Description (OSD) vocabulary to provide a way for the application vendor to subscribe the user to a software update channel that the vendor can use to notify users of software updates as they become available. At the time of installing the application, the user is prompted to subscribe to the software update channel. A shortcut (.lnk file) that the application installs is created with special information that identifies the application by a unique name. The channel is updated periodically based on the schedule suggested by the channel. When a new update is detected, the software channel delivers the software update to the user's computer and sends notifications by, for example, email or gleaming the icon to indicate that a new software update is now available. Also, the next time the user launches the application through the shortcut (.lnk file), the shell automatically displays the update notification information to the user.

BRIEF DESCRIPTION OF THE DRAWINGS

The invention will now be described with reference to the following drawings in which like reference numerals refer to like elements and wherein.

DETAILED DESCRIPTION

Figure 1:
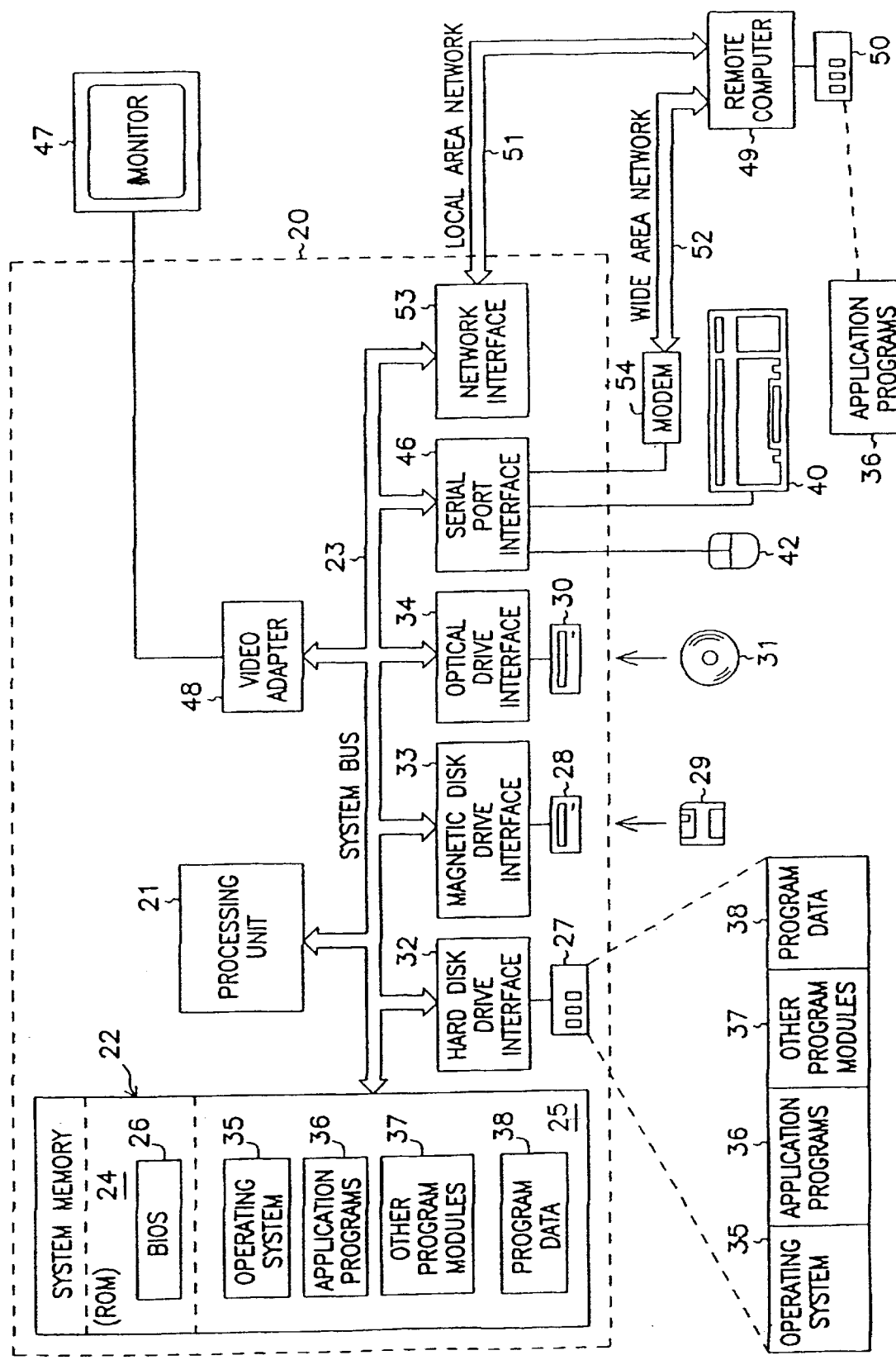
FIG. 1 is a block diagram showing the hardware and operating environment in conjunction with which embodiments of the invention may be practiced.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or a memory controller, a peripheral bus, and a local bus using any of a variety of bus architectures. The system memory includes read only memory (ROM) 24 and a random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from and writing to a removable magnetic disk 29, and an optical disk drive 30 for reading from and writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and a pointing device 42. Other input devices (not Shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof may be stored in the remote memory storage device. It will be appreciated that the network connections shown are exemplary and other means of establishing a communications link between the computers may be used.

As is familiar to those skilled in the art, the computer system 20 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory 22.

In accordance with the practices of persons skilled in the art of computer programming, the invention is described below with reference to acts and symbolic representations of operations that are performed by the computer system 20, unless indicated otherwise. Such acts and operations are sometimes referred to as being computer-executed. It will be appreciated that the acts and symbolically represented operations include the manipulation by the CPU 21 of electrical signals representing data bits which causes a resulting transformation or reduction of the electrical signal representation, and the maintenance of data bits at memory locations in the memory system 22 to thereby reconfigure or otherwise alter the computer system's operation, as well as other processing of signals. The memory locations where data bits are maintained are physical locations that have particular electrical, magnetic, optical, or organic properties corresponding to the data bits.

In an illustrative embodiment of the invention, the computer system 20 preferably uses the Windows 95 or Windows 98 client server operating system. However, other client/server operating systems (e.g. Windows NT, O/S2 by IBM, Mac OS, UNIX Windows CE, etc.) can also be used. A client/server operating system is an operating system which is divided into multiple processes of two different types: server processes, each of which typically implements a single set of services, and client processes, which request a variety of services from the service processes. Object oriented programming is used to design the client/server operating system, and applications which run under the client/operating system, where objects represent system resources.

For example, the Windows 95 client/server operating system provides shareable resources, such as files, memory, processes and threads, which are implemented as "objects" and are accessed by using "object services." As is well known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within the computer memory 22 and represent specific electrical, magnetic or organic elements.

An "object type," also called an "object class," comprises a data-type, services that operate in instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e., sometimes known as an object method) defined in the object's class, and a data block, containing the current values for each object variable (i.e., data members, sometimes known as an object property). An application has some reference to an object through the object pointer. An application obtains this object reference by using some type of function call (direct or implied) in which that function allocates an object block in computer memory, initializes the function table, and reruns the reference to the computer memory to an application. The computer memory may be local or distributed on a remote computer.

The Windows 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

In an illustrative embodiment of the invention, processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context" which is the volatile data associated with the execution of the thread. A thread's context includes the contents of system registers and the virtual address belonging to the threads process. Thus, the actual data comprising a threads context varies as it executes.

Figure 2:
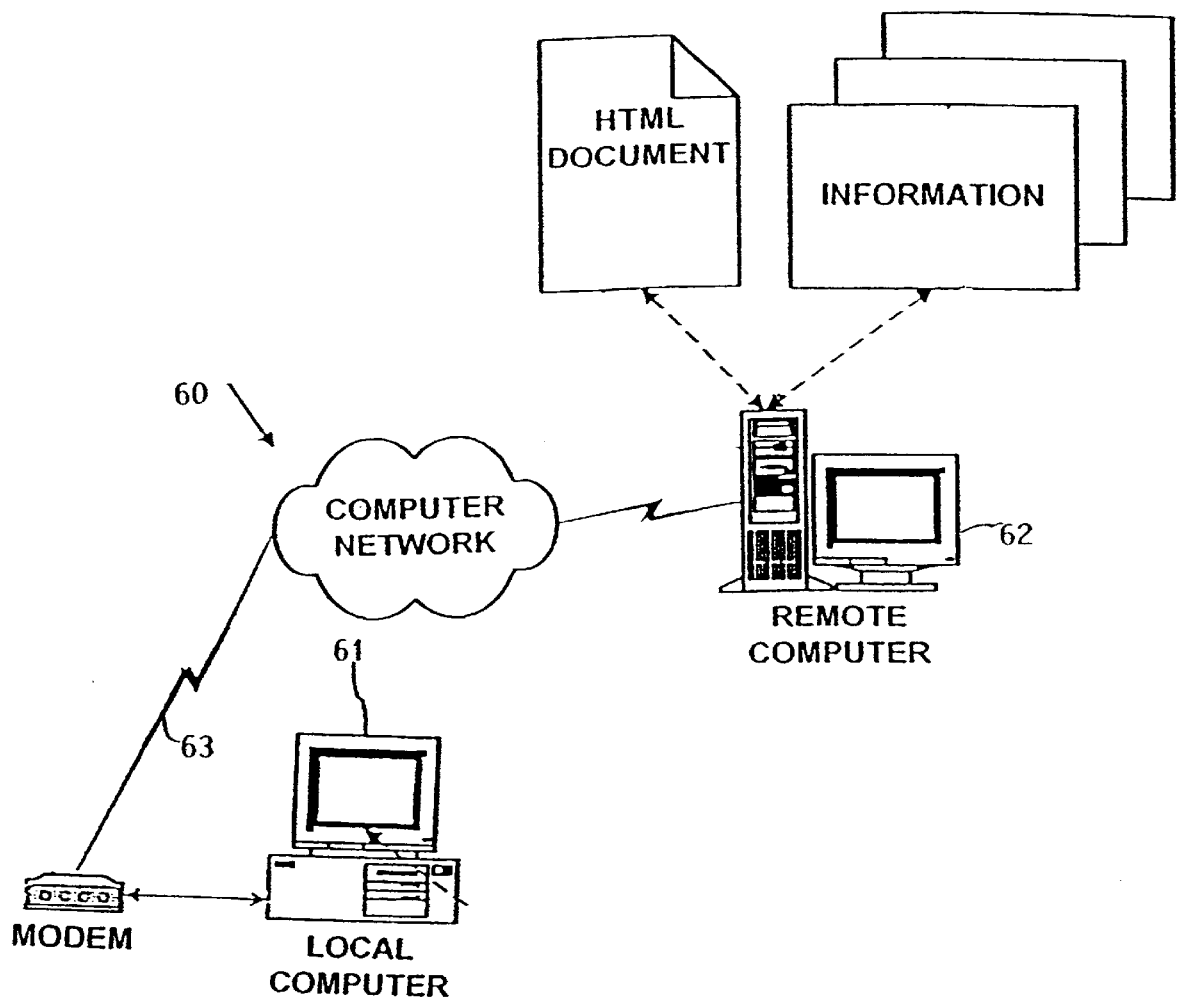
FIG. 2 illustrates a browsing environment.

In a browsing environment 60 of FIG. 2, a local computer 61 runs software referred to herein as a "browser" for unified browsing of electronic documents and other data from local sources and from a computer network (e.g., the Internet, an intranet). The browser can be integrated with an operating system software, or can be a separate application software. The browser is typically an object oriented application. The illustrated remote computer network 62 is the Internet. In the illustrated browsing environment 60, the local computer 61 connects to the computer network 62 over a telephone line 63 via a modem, a satellite link, an optical fiber, an Ethernet or other local area network technology wire and adapter card, radio or optical transmission devices, etc. The invention can alternately be embodied in a browsing environment for other public and private computer networks, such as a computer network of a commercial on-line service or an internal corporate local area network (LAN), an intranet, or like computer network.

One embodiment of the invention will now be described with reference to FIG. 3. First, the software vendor sets up a software update channel, in step 100. As noted above, the software update channel provides a link between the software vendor's web page and at least one user's computer so as to allow the software vendor to send software updates to the users. As will be described in more detail below, the user can subscribe to the software update channel when the user initially loads the software on the user's computer or at a later time, in step 102. Once the user subscribes to the software update channel, the user's computer will periodically check via the software update channel whether a new update is available in step 104. If a new update is not available, in step 106, the user's computer will continue to periodically check the software update channel for a new update on a schedule prescribed by the software update channel.

If a new update is detected, in step 106, the software update channel downloads the update information to the user's computer in step 108. When the user next uses the computer or the specific application, the user is notified that a new update is available in step 110. The computer then queries the user to determine if the user wants to load the new update now in step 112. If the user does not want to load the new update, the computer can then inquire if the user may want to load the update in the future in step 114. If the user does not want to ever load the new update, the computer notes that the update has been received in a registry, in step 116, and returns to step 104 to check periodically for the next software update. However, if it is determined in step 112 that the user wants to load the new update, the new update is loaded in step 118 and the registry is updated to note the version of the software that was loaded in step 116. The computer then returns to step 104 to periodically check for the next software update. It will be appreciated by one skilled in the art that steps 110, 112, 114, and 118 could be skipped by automatically updating the user's computer every time a new update is detected.

Figure 3:
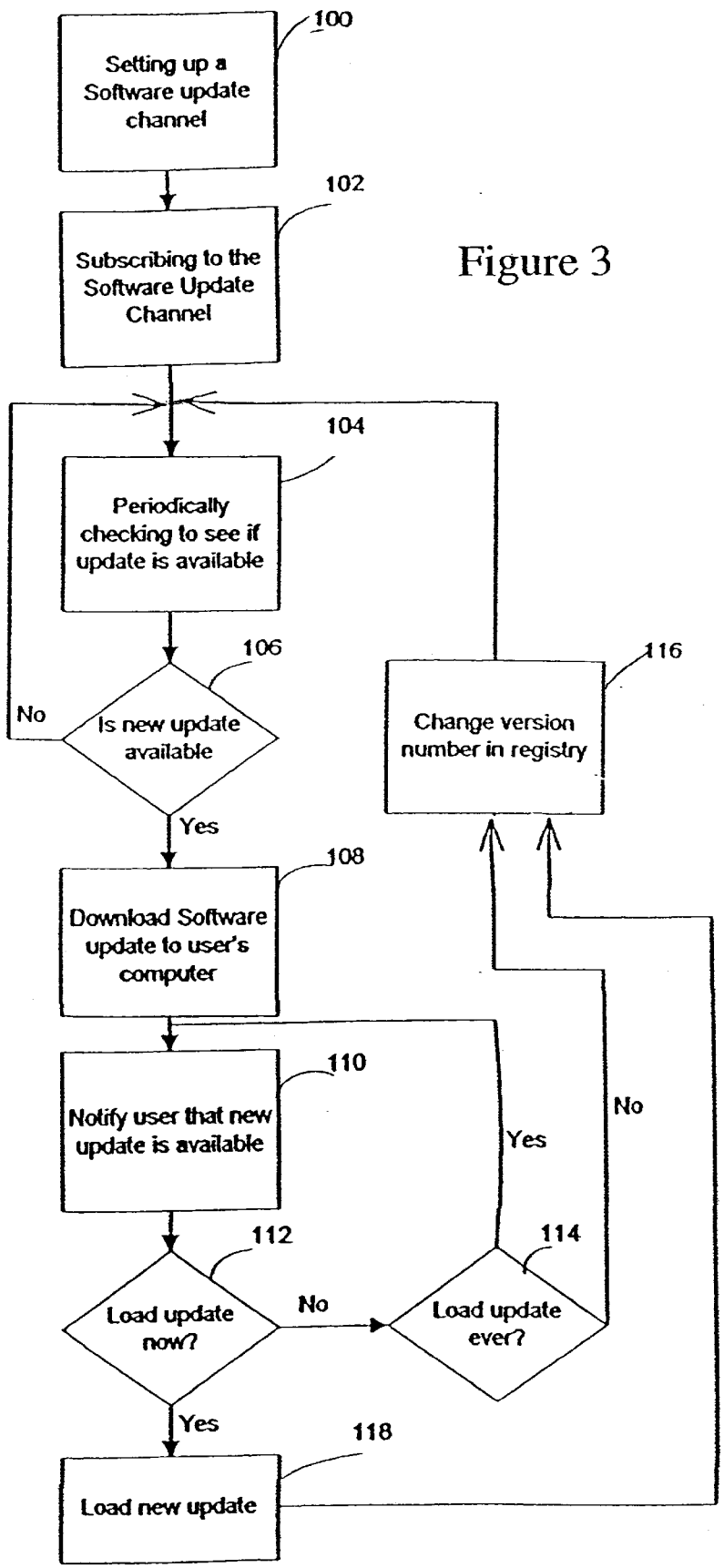
FIG. 3 is a flow chart illustrating a method for notifying a user of a software application update according to one embodiment of the invention.

The following description will now more fully describe the individual steps of FIG. 3. As noted above, the invention uses Open Software Description (OSD) vocabulary. OSD specifies a vocabulary used for describing software packages and their dependencies for client computers which is a subset of the Extensible Markup Language (XML). Using the XML model, markup tags in the OSD vocabulary are represented as elements of a tree. The three basic relationships between the elements are "parent of;""child of," and "sibling of." Distant relationships can be formed from recursive applications of the three basic ones. Additional information on the OSD vocabulary can be found in the *Specification for the Open Software Description (OSD) Format* published on Aug. 11, 1997, and available for download from either Microsoft Corporation or Marimba, Inc.

The OSD vocabulary can be used in a stand-alone XML manifest file to declare the dependencies between different software components for different operating systems and languages. The OSD file provides instructions that can be used to locate and install only the required software components depending on the configuration of the target machine and what software is already present. The OSD formatted manifest file can also be embedded in an archive file, such as a Java Archive (.JAR) file, or a composite, compressed file such as a cabinet (.CAB) file, that contains the distribution unit to form a distribution unit file.

The creation of the software update notification channel will now be described but the invention is not limited thereto and this example is being given as only one illustration of how a software update channel can be created. The following is a .CDF (Channel Definition Format) file illustrating the creation of a software update channel:

<?XML version="1.0"?>
<CHANNEL HREF=http://testserver/logo5/logo5.htm>

```
<TITLE>Green (MSAppLogo5) Test Channel</
    TITLE>
<LOGO HREF=http://testserver/logo5/green.ico"
    STYLE="icon"/>
<USAGE VALUE="SoftwareUpdate"/>
<SOFTPKG HREF="http://testserver/logo5/
    logo5.htm"
  NAME="{55272F7E-1B37-11D1-8933-
    00805F8A4D63 }"
  Version="1,1,0,1"
  STYLE="MSAppLogo5"
  PRECACHE="yes">
  TITLE>Green</TITLE>
  <ABSTRACT>Abstract: Green v1.1 application adver-
    tised via channel </ABSTRACT>
  <IMPLEMENTATION>
    <CODEBASE HREF=http://testserver?logo5/green-
      x.exe/>
  </IMPLEMENTATION>
</SOFTPKG>
</CHANNEL>
```

Figure 4:
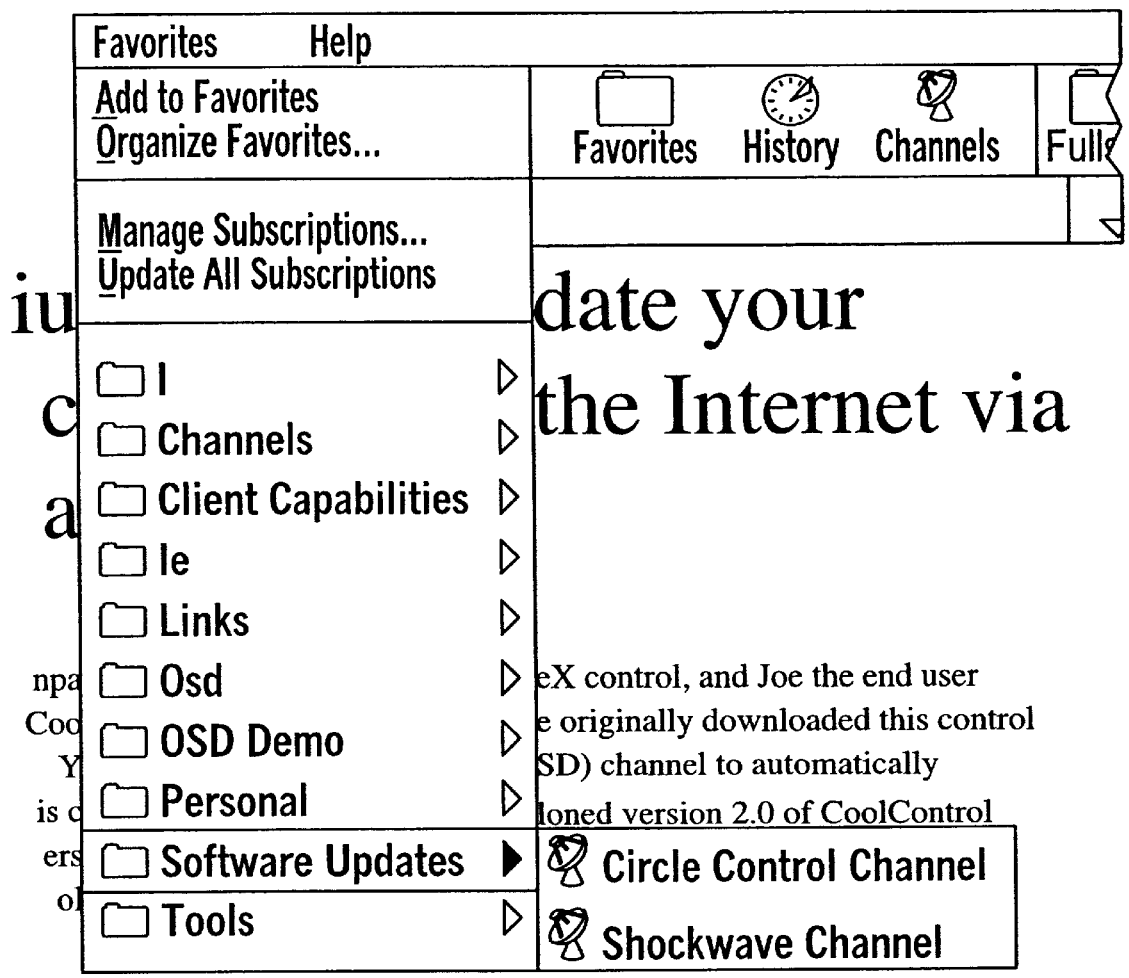
FIG. 4 is a window screen illustrating the notification of the user according to one embodiment of the present invention.

The software vendor can customize the above text in the following manner to create a software update channel. First, the CHANNEL HREF is replaced to point to a URL that the vendor wants the user to use when the user first subscribes to the channel and when the user clicks on the channel in the future. The TITLE is then changed typically to the name of the software plus the phrase "Update Channel." This will show up in the Microsoft Internet Explorer's Favorites/Software Updates, as illustrated in FIG. 4. The LOGO is shown next to the TITLE in the Microsoft Internet Explorer's Software Updates folder. The vendor can choose a custom icon or delete this tag (from <LOGO to/>) to use the default satellite dish logo from Microsoft Internet Explorer.

The SOFTPKG HREF is replaced to point to a URL that the vendor wants to send the user when an update is available. Initially before there is a new version and the vendor doesn't know where the new information will be posted, the vendor can point to the same location as used for the CHANNEL HREF. The NAME is then changed to either a GUID (Globally Unique Identifier) (as shown) representing the software or to the applications name in the Uninstall branch of the Registry. The Version number is then changed to the version number of the software. The vendor can then change the PRECACHE to no if the vendor doesn't want Internet Explorer to automatically receive the software update bits at the subscription update time. The TITLE is then changed to reflect the vendor's software name which will be shown in the update dialog box when the user is notified of an update. The ABSTRACT is also changed to give the user a description of the software which will also be shown in the update dialog box. Finally, the CODEBASE is changed to point to the URL of the vendor's software. This can point to a .CAB or an .EXE.

When a new version of the software becomes available, the vendor changes the .CDF file on the vendor's web server. First, the version number is changed to the new larger number. The old .CAB, .EXE, etc., file pointed to by the CODEBASE tag is either overwritten with the new file or the CODEBASE tag can be changed to point to the new file. The SOFTPKG HREF tag is changed to point to the URL that the vendor wants to send to the user in order to allow the user to read about the features and installation instructions of the new software.

At installation of the application, the setup program for the application creates a shortcut to the application (or a LNK file) in a special way that stamps the LNK file with the application name (appname). The appname is the same as the subkey HKEY_LOCAL_MACHINE\SOFTWARE\Microsoft\Windows\Current Version\Uninstall\<your AppName>. At install time, the user is typically prompted to subscribe to the application's software update channel. It will be understood that this step does not need to be performed at installation and the feature will still work if the subscription is performed at another time after the setup of the application via, for example, a web page for the application vendor or the like.

The modification of the shortcut (.lnk file) will now be described. The modification can be performed in several ways. First, the operating system may have a mechanism for automatically creating the modified shortcuts. In the alternative, several other methods can be used. First, the following Windows function inside the installation code is called or the function is called on the first execution of the program:

Ishe11Link::SetPath(::{(9 db1186f-40df-11d1-aa8c-00c04fb67863}:AppName::Path);

To create the shortcut where:

| | |
|---|---|
| (::{(9db1186f-40df-11dl-aa8c-00c04fb67863 }: | MSAppLogo5 GUID, copy as listed |
| AppName | The name of the application in the registry's uninstalled branch under HKEY_LOCAL_MACHINE\SOFTWARE\Microsoft\Windows\CurrentVersion\Uninstall |
| Path | Path to the program (the normal target of the shortcut) |

Alternatively, the shortcut can be made OSD-aware after it is created using the freely distributed blesslnk tool provided by Microsoft in the \bin directory of the Internet Client SDK 4.01 refresh package. After placing the shortcut on the user's machine, the following command is executed:

Blesslnk −1 AppName FullPath where:

| | |
|---|---|
| AppName | The name of your application in the HKEY_LOCAL_MACHINE\SOFTWARE\Microsoft\Windows\CurrentVersion\Uninstall branch of the registry |
| FullPath | The full directory path to the shortcut |

This can run at the end of the setup program or on the initial launch of the program. If the link is not made OSD-aware, the user can still be notified of updates by the gleam mechanism described below, but the user will not get the notification dialog box upon launching the shortcut.

A security enhancement can also be incorporated wherein the software decides which site is authorized to update the software. An AuthorizedCDFPrefix key can be included under the HKEY_LOCAL_MACHINE\Software\Microsoft\Windows\Current Version\Uninstall\<Your AppNane> branch which contains a default value which specifies which URLs which are authorized to update the software. For example, Microsoft Word® can be installed and then set up one of the AuthorizedCDFPrefix keys to be "http://www.microsoft.com,". Thus, only the specified Microsoft site would be authorized to update the software thereby preventing non-authorized sites from updating or corrupting the software.

Figure 5:
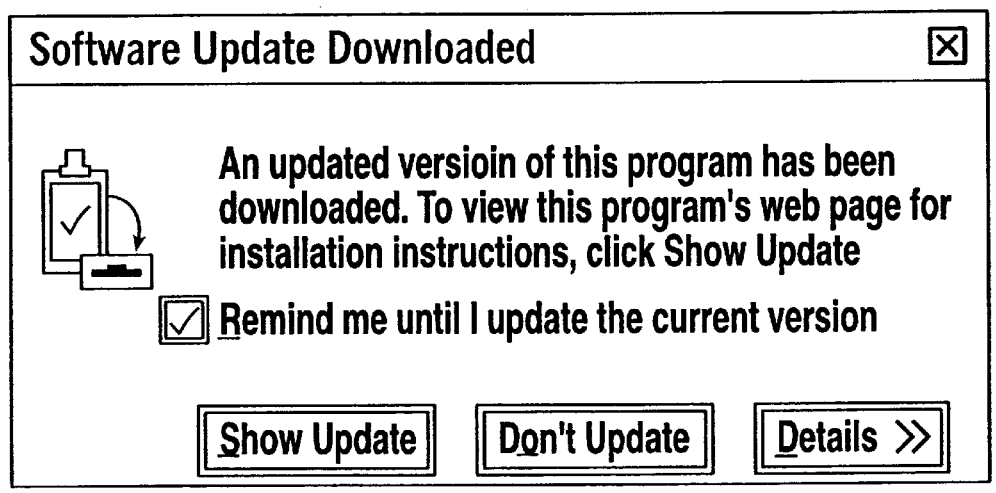
FIG. 5 is a window screen illustrating the notification of the user according to one embodiment of the present invention.

Each time the IE (Internet Explorer) shell resolves a link, the shell checks to see if the link contains a data block whose signature is that of the product ID. If that block is present, the product id within the block is extracted. The shell then consults the registry to see if a new version of the software has been advertised via the software update channel and if the user has already been made aware of the new version. If there is a new advertisement or version, a message box window, such as the one illustrated in FIG. 5, is displayed presenting information from the software update channel about the new version. This message box also gives the user the option of launching a browser to a Web page that contains information on how to obtain or install the new version of software. It also has a checkbox through which the user can indicate that the user is uninterested in the new version.

An alternative method for determining whether there is a new advertisement available will now be described. A distinction first needs to be made among three different version numbers associated with a product and product ID. The first version is the installed version. The installed version is that version that is actually present on the user's machine. The advertised version is the most recent version that the user has been informed of via the shell notification mechanism. The update version is the version that is currently available via the software update channel.

When a software update is available, the vendor changes the CDF file on the server to reflect the new version of the software that is available. For a given update version, the software update channel is capable of delivering a simple notification of the version or of downloading the installation files for the new version in preparation for installation at the user's discretion. The registry information for the product tracks where the user is in the notification and installation cycle as the advertisement state (or adState).

The advertisement state may progress through a series of increasing values:

SOFTDIST_ADSTATE_NONE—the update version has not been brought to the user's attention;

SOFTDIST_ADSTATE_AVAILABLE—the user has been notified of the update's availability;

SOFTDIST_ADSTATE_DOWNLOADED—the user has been notified that the update installation package has been downloaded to the user's machine;

SOFTDIST_ADSTATE_INSTALLED—the user has been notified that the update has been completely installed on the user's machine.

A given update version begins in a state indicating that the update version has not been advertised (SOFTDIST_ADSTATE_NONE). At the time of the shell link resolution, the update version is compared to the other versions (installed and advertised). If the update version is greater that or equal to the installed version and the advertised version, the shell compares the adState in the registry with the new computed advertisement state (or adStateNew). If the installed version equals the update version, the computed advertisement state is SOFTDIST_ADSTATE_INSTALLED, indicating that the update version is already on the user's machine. Otherwise, if the software update channel has set its precache flag, the computed advertisement state is SOFTDIST_ADSTATE_DOWNLOADED, else it is SOFTDIST_ADSTATE_AVAILABLE.

If adStateNew is greater than the stored adState, then there is fresh information to bring to the user's attention and the message box is displayed. If the user sets the "don't remind me" checkbox, and dismisses the message box with some response other than 'Cancel', the value of adStateNew is stored in the registry replacing the previous adState, and the update version is stored as the new advertised version.

The next time the client machine updates the software channel, it detects an update and sends the appropriate notification (email, gleaming icon, etc.). For the purposes of shell notification, the software update information is recorded under HKEY_LOCAL_MACHINE\SOFTWARE\Microsoft\Windows\CurrentVersion\Uninstall\<your AppName>\Available Version.

When the user launches the application by clicking on the LNK file for the application, the shell inspects the LNK file for appname information and if present compares the installed version versus the available version as recorded at channel update time to see if the user should be notified. If necessary the shell brings up a dialog about the software update. The user has an option to inspect the update information in which case the user is taken to a setup web page for the application update, or can choose to ignore the update and proceed to use the non-updated application. The user also will be reminded of the update until the user installs the update or chooses to permanently ignore this version of the update.

Although the present embodiments of the invention have been described in detail, it should be understood that various changes, alterations and substitutions can be made therein without departing from the spirit and scope of the invention as defined by the appended claims.

We claim:

1. A method for updating software, comprising the steps of:

installing software on a local computer;

creating a shortcut link for launching the installed software, wherein said installed software is identified in the shortcut link by version data;

subscribing to a software update channel;

detecting through said software update channel that a new software update is available on a remote computer;

recording data relating to said new software update on said local computer, wherein said data comprises new version data;

comparing said version data stored in said shortcut link with version data from said new software update when said installed software is launched using said shortcut link; and updating said installed software when said new version data is more current than said version data stored in said shortcut link.

2. A method according to claim 1, wherein said local computer periodically checks the software update channel to determine if a new software update is available.

3. A method according to claim 1, further comprising the step of:

updating the version data stored in said shortcut link after the software has been updated.

4. A method according to claim 1, wherein a user subscribes to said software update channel during initial installation of the software.

5. A method according to claim 1, wherein a user subscribes to said software update channel after installation of the software.

6. A method according to claim 1, wherein a user is notified that a software update is available by email.

7. A method according to claim 1, wherein a user is notified that a software update is available by a gleaming icon.

8. A method according to claim 1, wherein a user is notified that a software update is available when the software is loaded on said local computer.

9. A method according to claim 1, further comprising the steps of:
   determining whether said software update is from an authorized site; and
   allowing software on said local computer to be updated from only the authorized site.

10. The method of claim 1, further comprising:
    notifying a user that the new software update is available; and
    querying the user to determine whether the user desires to load the new software update, wherein said updating of the installed software is performed when, in response to the querying step, the user indicates a desire to load the new software update.

11. A method for updating software, comprising the steps of:
    installing software on a local computer;
    creating a shortcut link for launching the software, wherein said installed software is identified in said shortcut link by version data;
    subscribing to a software update channel;
    detecting through said software update channel that a new software update is available on a remote computer;
    automatically loading said new software update on said local computer when said new software update is detected;
    comparing said version data stored in the shortcut link with version data of said new software update when said new software update is launched using said shortcut link; and
    updating said installed software on said local computer when said version data of said new software update is more current than said version data stored in said shortcut link.

12. A method according to claim 11, wherein said local computer periodically checks the software update channel to determine if a new software update is available.

13. A method according to claim 11, wherein a current version of the installed software is recorded in a registry in said local computer.

14. A method according to claim 11 further comprising the step of:
    updating the version data stored in said shortcut link after the software has been updated.

15. A method according to claim 11, wherein a user subscribes to said software update channel during initial installation of the software.

16. A method according to claim 11, wherein a user subscribes to said software update channel after installation of the software.

17. A method according to claim 11, wherein a user is notified that a software update is available by email.

18. A method according to claim 11, wherein a user is notified that a software update is available by a gleaming icon.

19. A method according to claim 11, wherein said user is notified that a software update is available when the software is loaded on said local computer.

20. A method according to claim 11, further comprising the steps of:
    determining whether said software update is from an authorized site; and
    allowing software on said local computer to be updated from only the authorized site.

21. A method for installing and updating software, comprising the steps of:
    installing software on a local computer;
    creating a shortcut link for launching the installed software, wherein said installed software is identified in the shortcut link by version data;
    subscribing to a software update channel;
    detecting through said software update channel that a new software update is available on a remote computer;
    recording data relating to said software update on said local computer, wherein said data comprises new version data;
    comparing said version data stored in said shortcut link with version data from said new software update when said installed software is launched using said shortcut link; and
    updating said installed software when said new version data is more current than said version data stored in said shortcut link.

22. A method for installing and updating software, comprising the steps of:
    installing software on a local computer;
    creating a shortcut link for launching the installed software, wherein said installed software is identified in said shortcut link by version data;
    subscribing to a software update channel;
    detecting through said software update channel that a new software update is available on a remote computer;
    automatically loading said new software update on said local computer when said new software update is detected;
    comparing said version data stored in the shortcut link with version data of said new software update when said installed software is launched using said shortcut link; and
    updating said installed software on said local computer when said version data of said new software update is more current than said version data stored in said shortcut link.

23. A method for installing and updating software, comprising the steps of:
    first, installing software on a local computer;
    after the installing step, creating a shortcut link for lauching the installed software, wherein said installed software is identified in the shortcut link by version data and the creating of the shortcut link is performed by an operating system function within installation code;
    after the installing step, subscribing to a software update channel;
    after the subscribing step, detecting through said software update channel that a new software update is available on a remote computer;
    after the detecting step, recording data relating to said new software update on said local computer, wherein said data comprises new version data;
    comparing said version data stored in said shortcut link with version data from said new software update when said installed software is launched using said shortcut link; and updating said installed software when said new version data is more current than said version data stored in said shortcut link.

24. The method of claim 23, further comprising the step of providing a notification to a user responsive to said data.

25. A method for installing and updating software, comprising the steps of:

first, installing software on a local computer;

after the installing step, creating a shortcut link for launching the installed software, wherein said installed software is identified in the shortcut link by version data and the creating of the shortcut link is preformed by an operating system function within installation code;

after the installing step, subscribing to a software update channel;

after the subscribing step, getting through said software update channel that a new software update is available on a remote computer;

after the detecting step, recording data relating to said new software update on said local computer, wherein said data comprises new version data;

after the detecting step, automatically loading said new software update on said local computer when said new software update is detected;

comparing said version data stored in said shortcut link with version data from said new software update when said installed software is launched using said shortcut link;

updating said installed software when said new version data is more current than said version data stored in said shortcut link.

26. The method of claim 25, further comprising the step of providing a notification to a use responsive to said data.

* * * * *

UNITED STATES PATENT AND TRADEMARK OFFICE
CERTIFICATE OF CORRECTION

PATENT NO. : 6,353,926 B1  Page 1 of 1
DATED : March 5, 2002
INVENTOR(S) : Srivatsan Parthesarathy et al.

It is certified that error appears in the above-identified patent and that said Letters Patent is hereby corrected as shown below:

Column 3,
Line 63, -- wide area -- has been added.

Column 5,
Line 18, "reruns" has been replaced with -- returns --.

Column 12,
Line 49, "lauching" has been replaced with -- launching --.

Column 13,
Line 12, "preformed" has been replaced with -- performed --.
Line 17, "getting" has been replaced with -- detecting --.

Signed and Sealed this

First Day of April, 2003

JAMES E. ROGAN
*Director of the United States Patent and Trademark Office*